United States Patent [15] 3,641,564

Fassett et al. [45] Feb. 8, 1972

[54] DIGITAL-TO-ANALOG AND ANALOG-TO-DIGITAL SIGNAL TRANSLATION WITH OPTICAL DEVICES

[72] Inventors: Matthew Fassett, Belmont, Mass.; Phyllis S. Unger, Rochester, N.Y.

[73] Assignee: Stromberg-Carlson Corporation, Rochester, N.Y.

[22] Filed: June 23, 1966

[21] Appl. No.: 559,973

[52] U.S. Cl. ......................340/347 AD, 340/347 P, 250/217

[51] Int. Cl. ......................H03k 13/02

[58] Field of Search ..............250/199, 205, 217 SS, 219 QA, 250/219 Q, 219 DC; 340/347

[56] References Cited

UNITED STATES PATENTS

| | | | |
|---|---|---|---|
| 3,216,005 | 11/1965 | Hoffman et al. | 340/347 |
| 3,407,301 | 10/1968 | Kovanic | 250/199 |
| 3,114,144 | 12/1963 | Woo | 340/347 |
| 3,122,735 | 2/1964 | Townsend | 340/347 |
| 3,219,996 | 11/1965 | Masters | 340/347 |
| 3,413,480 | 11/1968 | Biard et al | 250/217 X |

*Primary Examiner*—Maynard R. Wilbur
*Assistant Examiner*—Charles D. Miller
*Attorney*—Charles C. Krawczyk

[57] ABSTRACT

A signal-translating apparatus is disclosed wherein an electrical signal can be transformed between analog form and digital form by use of electrically energizable radiation sources which are selectively energized to produce a radiation signal in one form and electrical and optical means are used to modify this radiation signal into an electrical signal of a different form.

4 Claims, 5 Drawing Figures

INVENTORS
MATTHEW FASSETT
PHYLLIS S. UNGER
BY
Hofman Stone
ATTORNEY

DIGITAL-TO-ANALOG AND ANALOG-TO-DIGITAL SIGNAL TRANSLATION WITH OPTICAL DEVICES

This invention relates to novel arrangements including optical devices for translating electrical signals from digital to analog and from analog to digital form.

In modern communications technology, it is often desirable to convert electrical signals from analog form to digital form for transmission, storage, or processing, and then to convert the resulting digital signal to one in analog form for further use. Many different systems and methods are currently in use to perform these functions. One of the problems presented to the designer of such systems, commonly referred to as encoders and decoders, respectively, has to do with speed, and as attempts have been made to achieve ever greater speeds, the systems have tended to become ever more complex and expensive.

Accordingly, one important object of the present invention is to provide encoders and decoders that may be made capable of very rapid operation using components that are currently available commercially, yet that are of relatively simple and inexpensive design and construction.

Briefly, the invention contemplates the use of electrically energizable light sources in conjunction with appropriate masks and photodetectors to produce first a light signal responsively to an input signal in one form, either analog or digital, as the case may be, and then, responsively to the light signal, to produce an electrical output in the other form, either digital or analog.

According to the embodiments of the invention described herein, which are the presently preferred embodiments for utilizations where high-speed operational capability is desired, the light sources are semiconductor junction devices of the type known as light-emitting diodes (LED's) or injection lasers. Devices of this type, and many of their operative characteristics are described in a series of articles in the IBM Journal of Research and Development for Jan. 1963, pages 58 through 75, and in an article in the Proceedings of the IRE for Sept. 1962, pages 1976 and 1977.

LED's have been shown to be capable of flashing repetitively at rates greater than 100 million separate flashes per second. When they are used in conjunction with high-speed photodetectors such as, for example, photomultiplier vacuum tubes, very high rates of signal translation can be achieved in the practice of the invention.

Where high speed, or wide bandwidth is not necessary, other light sources may be used in the practice of the invention such as, for example, gas filled electric discharge tubes.

In the case of converting digital signals to analog form according to one embodiment of the invention, a PCM (pulse code modulated) signal, which may be, for example, in binary form, is supplied to a bank of LED's. One LED is provided for each weighted value of the code. Light from the diodes is directed upon a common photodetector through respective attenuating masks, which are arranged to attenuate the light from the respective diodes in inverse proportion to the respective weighted values of the code assigned to them. In this way, the total light reaching the detector constitutes a light signal in analog form indicating the converted value of the digital input signal. The detector converts the analog light signal to an electrical signal, which is also in analog form. Since the light-emitting diodes can be flashed with substantially uniform output at rates higher than 100 megacycles per second, and since photodetectors are commercially available capable of responding at a similar rate, very high-speed decoding can be achieved with relatively simple and inexpensive equipment.

According to another embodiment of the invention, an analog signal may be encoded at a comparable rate by an array of LED's, one LED being provided for each discreet signal level of the analog signal definable by the digital code. The analog signal is fed through a comparator, which measures its average amplitude over a predetermined interval and triggers the one of the LED's that is assigned to the signal level nearest the average amplitude. Light from the triggered LED is directed through an assigned portion of a coded mask and thence upon a common array of photodetectors. One photodetector is provided for each weighted value of the digital code.

Representative embodiments of the invention will now be described in detail in connection with the accompanying drawing, wherein.

THE DECODER

Figure 1:
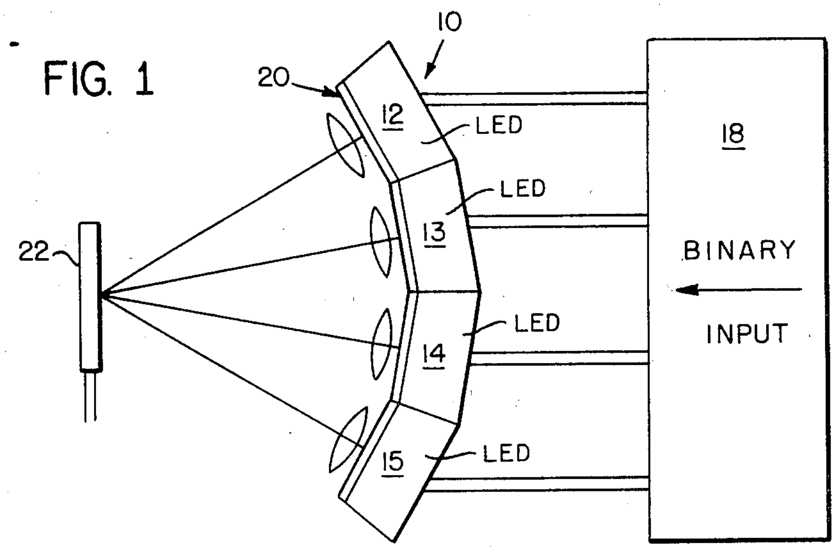
FIG. 1 is a schematic plan diagram of a signal decoder according to a first embodiment of the invention.
Figure 2:
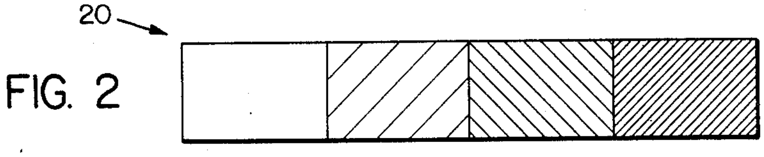
FIG. 2 is a developed elevational view of an attenuating mask suitable for use as an element of the decoder shown in FIG. 1.

Referring now to the drawing, FIG. 1 illustrates a decoder according to the invention which includes an array 10 of LED's one for each weighted value of a digital binary code. By way of example, four LED's 12, 13, 14, and 15 are shown, as would be used in the case of a simple binary code having four weighted values and capable of discriminating among 16 discreet levels of an analog signal. The LED's 12–15 are connected to an energizing circuit 18 for energization responsively to binary coded signals, which are ordinarily in the form of electrical pulses of uniform amplitude and duration, so that each LED produces a total light output of predetermined value in response to each pulse of the code signal directed to it. The light output from the LED's 12–15 is directed through an attenuator 20 to a photodetector device 22, which may be, for example, a photomultiplier-type vacuum tube. The attenuator 20 is graded density in accordance with the weighted values of the binary code, so that proportional fractions of the light outputs of the respective diodes 12–15 reach the detector 22. For example, in a simple binary code, the weighted values may be 1, 2, 4, and 8, in which case the attenuator 20 would be arranged for maximum transmission of light from the LED that represents the value 8. The light from the LED representing the value 4 would be attenuated by one half; that from the LED representing the value 2 by three quarters; and that from the LED representing the value 1 by seven-eigth's. The attenuator 20 is also preferably of the so-called neutral density type to avoid having to make special allowance, or adjustment for the color sensitivity characteristics of the photodetector 22.

The detector 22 adds the respective inputs and produces an output electrical signal indicative of the total light received, which is an analog signal corresponding to the digital input signal.

The system is operative as shown, and as so far described for cases where all of the binary pulses for a given individual signal unit occur simultaneously. In certain situations, however, the binary pulses for a given signal unit occur in sequence, in which case an electrical delay system must be provided to accomplish proper time integration of the signals. There are many such systems that will be apparent to those of ordinary skill in the art. For example, appropriate time delay circuits may be provided between the binary input 18 and the respective LED's 12–15 so that although binary pulses occur in timed sequence, they are subjected to different respective delays before they energize their respective LED's. In this case, for each unit of the binary signal, all of the energized LED's would be energized simultaneously. Alternatively, a suitably gated integrating circuit may be connected across the output of the photodetector 22 to integrate the output of the photodetector 22 during the time span occupied by each unit of the binary input.

The practice of the invention is not intended to be limited to the use of LED's as pulse energized light sources, but is intended also to encompass the use of any other desired type of light source in place of the LED's 12–15 shown. The LED's are preferred, however, because they are capable of relatively uniform operation, and, more importantly, because of their capability of high speed. LED's currently available commercially are capable of producing more than 100 million separate output pulses of light per second, thereby permitting the achievement of a signal frequency bandwidth greater than 100 megacycles per second for decoding. For slower speed operation, where large bandwidths and rapid operation are not required, other light sources may be used such as, for example, gas ionization devices.

THE ENCODER

Figures 3, 4:
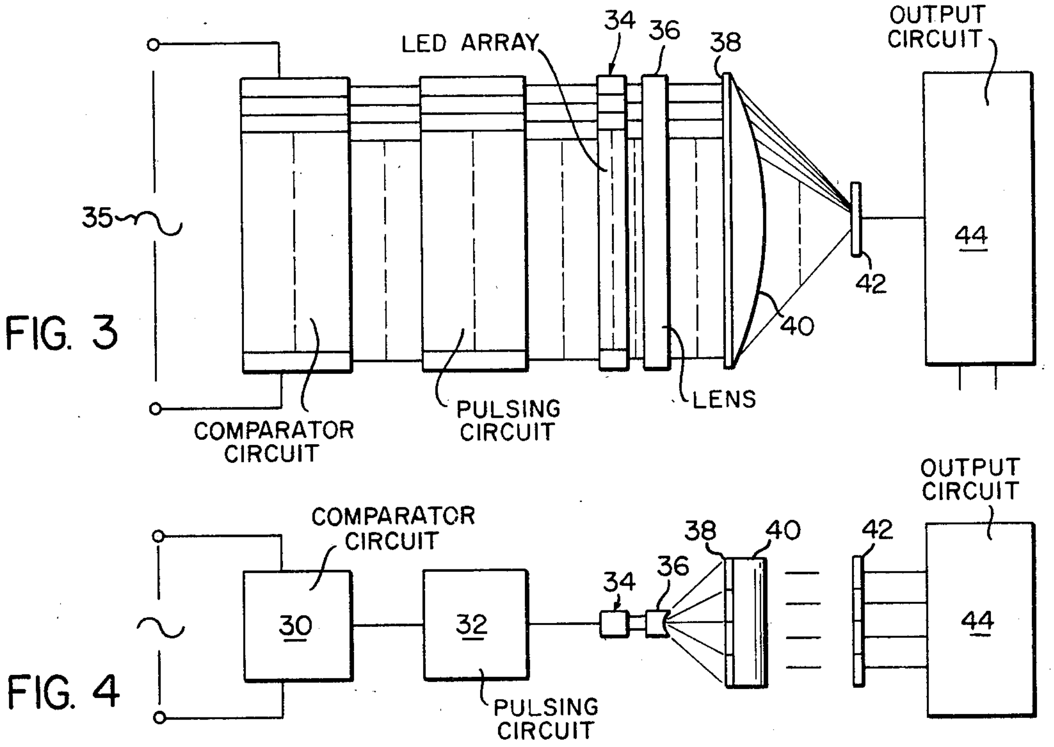
FIG. 3 is a side elevational view in schematic form of a signal-encoding system according to a second embodiment of the invention.
FIG. 4 is a plan view in schematic form of the encoder shown in FIG. 3.
Figure 5:
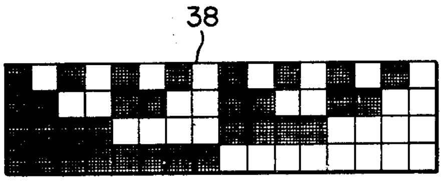
FIG. 5 is a diagrammatical view of the optical mask used as one element of the encoder shown in FIGS. 3 and 4.

The encoder shown in FIGS. 3–5 includes a signal comparator 30 which selectively triggers pulsing circuits generally designated 32 responsively to the average values of an input signal 35 in analog form over successive sampling periods of predetermined duration. The signal comparator triggers only one of the trigger pulsing circuits 32 at the end of each sampling period for selectively energizing one of an array of LED's 34 in accordance with the amplitude of the input signal 35 during the particular sampling period. One pulsing circuit 32 and one LED 34 are provided for each distinguishable signal level of the analog signal 35 as determined by the digital code. For example, in a four unit binary code, there are 16 distinguishable signal levels, and there would be 16 pulsing circuits and 16 LED's respectively associated with each other. In a seven unit code, there are 128 distinguishable signal levels, and there would be 128 separate pulsing circuits and 128 LED's. An elongated cylindrical lens 36 is positioned in front of the array of LED's 34 to spread light from them across a mask 38. Because the light outputs of the LED's are restricted to a very narrow range of directions, it is believed that in most cases shields are not required to restrict the light from spreading in the vertical direction as viewed in FIG. 3, but such shields may be provided if desired. Each LED is arranged to illuminate only a single row in the mask 38, so that the light passing through the mask at any given instant constitutes a light signal in digital form corresponding to the level of the analog signal during the immediately preceding interval. After passing through the mask, the light is directed by a second cylindrical lens 40 to an array 42 of photodetectors (not separately designated) one photodetector being provided for each weighted value of the digital code. The detectors deliver their output signals to an output circuit 44, which may be arranged to transmit the signals sequentially or simultaneously in accordance with the utilization desired.

The second cylindrical lens 40 is curved on an axis normal to the axis of curvature of the first lens 36, and the light signals from each of the LED's 34 are directed to the single row 42 of detectors.

FIG. 5 shows a typical mask for use in the encoder shown in FIGS. 3 and 4 arranged to produce digital output signals in accordance with a four unit binary code. It is relatively simple for those skilled in the art to devise variations in details of the mask, and to extend it in accordance with the requirements of any desired digital signal code.

What is claimed is:

1. Signal-translating apparatus for producing an electrical signal in digital code form responsively to an electrical signal in analog form comprising:

a. plural, electrically energizable radiation sources, one for each discreet level of the analog signal definable by the digital code, b. comparator and pulsing means for selectively and sequentially energizing said sources in accordance with the average values of the analog signal during successive intervals of predetermined duration, c. plural radiation detectors, one for each weighted value of the digital code, for producing electrical signals responsively to radiation from said sources, and d. means including a code mask for directing radiation from said sources to various respective ones of said detectors in accordance with the digital code system, whereby said detectors produce a digitally coded electrical signal corresponding to the analog signal.

2. Signal-translating apparatus according to claim 1, wherein said radiation sources are light sources.

3. Signal-translating apparatus according to claim 2, wherein said light sources are light-emitting diodes.

4. Signal-translating apparatus for converting an electrical analog signal into an electrical signal in digital code having a preset number of weighted values comprising:

an input circuit for receiving analog electrical signals;

a signal comparator, coupled to said input circuit, for generating a preset number of switching signals each corresponding to different discrete amplitude levels of said analog signals;

a plurality of radiation emitting diodes, a separate one for each of said switching signals;

a plurality of pulsing circuits coupling said signal comparator to said plurality of radiation emitting diodes for energizing separate ones of said radiation emitting diodes by separate ones of said switching signals over successive sampling periods of predetermined duration;

a plurality of photodetector circuits, one for each of the weighted values in said digital code;

mask means formed with radiation opaque and transparent portions arranged in a geometric pattern, said pattern having a number of rows corresponding to the number of photodetector circuits and with the rows divided into a plurality of sections corresponding to said preset number of switching signals and wherein the opaque and transparent portions are arranged in each section so that separate sections correspond to separate digital numbers in said digital code;

optical means directing radiation from separate radiation emitting diodes to separate sections in said mask means; and optical means directing radiation from separate rows of said mask means to said separate photodetector circuits whereby said photodetector circuits produce a digital coded electrical signal corresponding to the analog signal.

* * * * *